UNITED STATES PATENT OFFICE.

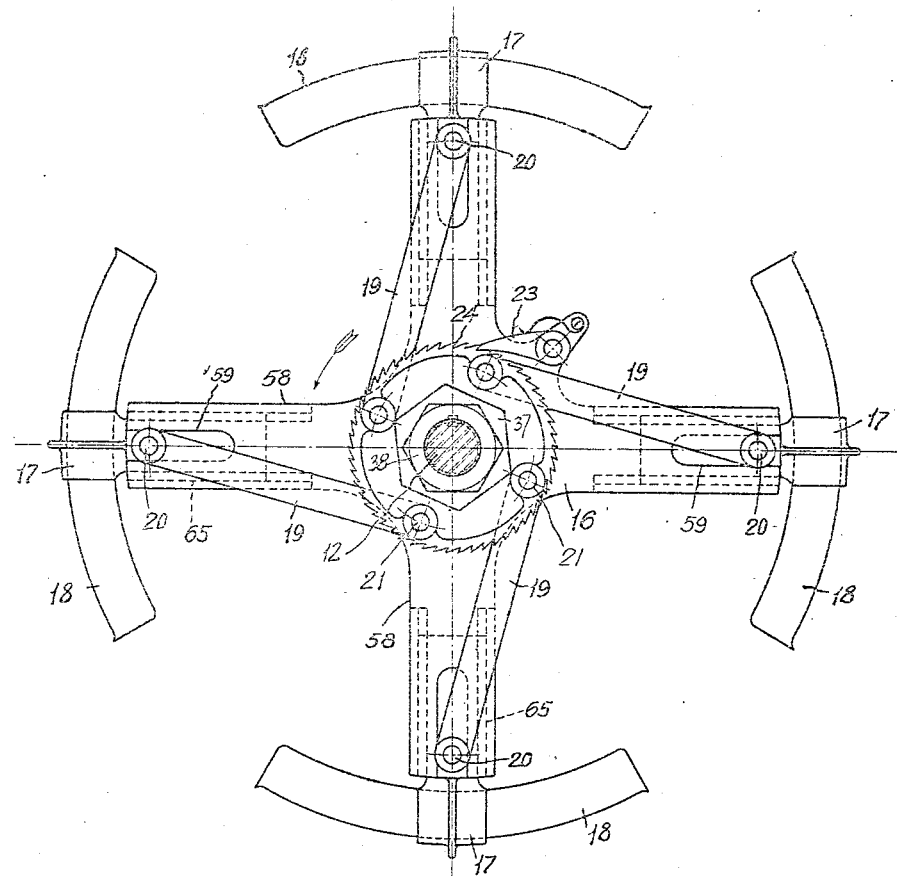
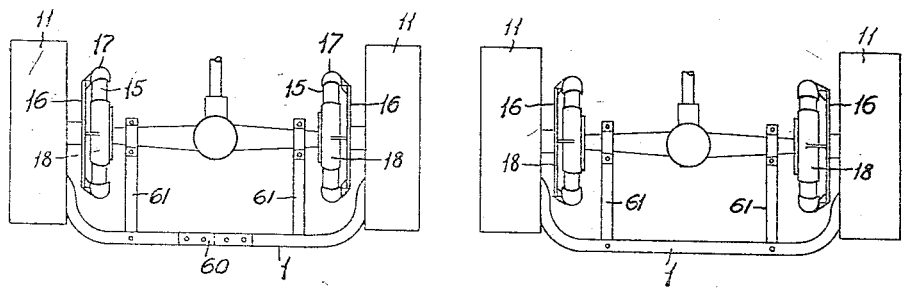

NELS L. OLSON, OF HIGHLAND PARK, MICHIGAN.

TRACTOR ATTACHMENT FOR AUTOMOBILES.

1,285,343.  Specification of Letters Patent.  Patented Nov. 19, 1918.

Application filed April 15, 1918. Serial No. 228,637.

*To all whom it may concern:*

Be it known that I, NELS L. OLSON, a citizen of the United States of America, residing at Highland Park, in the county of Wayne and State of Michigan, have invented certain new and useful Improvements in Tractor Attachments for Automobiles, of which the following is a specification, reference being had therein to the accompanying drawings.

This invention relates to a tractor attachment for an automobile, and has special reference to an attachment by which a pleasure or passenger automobile may be converted into a tractor for heavy duty work, as that of drawing agricultural implements, a trailer or other type of vehicle.

My invention is characterized by being applicable to any type of pleasure or passenger automobile, without removing the rear driven wheels of the automobile or any part thereof, consequently there is no danger of parts of the automobile being lost or injured when converting the same into a heavy duty machine. This is in contradistinction to the many tractor attachments which necessitate the removal of the rear driven wheels of an automobile, the use of jacks or auxiliary shafts, frames and other elements essential to make the change.

My invention is further characterized by variable speed traction wheels operatable in synchronism with the wheels of an automobile and in planes parallel therewith, said traction wheels maintaining the rear driven wheels of the automobile off the ground and with sufficient clearance to permit of the tractor being used for farm purposes.

My invention is further characterized by a traction wheel having a large annular anti-frictional bearing adapted to sustain the weight of the rear end of an automobile with its front wheels on the ground, and associated with said bearing is a compact planetary gearing provided with interexchangeable parts that permits of the speed of the traction wheel being changed to meet various requirements.

My invention will be hereinafter described and then claimed, and reference will now be had to the drawings, wherein—

Fig. 2 is a side elevation of the device for clamping or attaching a traction wheel to the automobile wheel.

Fig. 3 is a plan on a small scale of the tractor attachment, and

Fig. 4 is a plan, on a small scale of a two-part adjustable draw bar.

Figure 1:
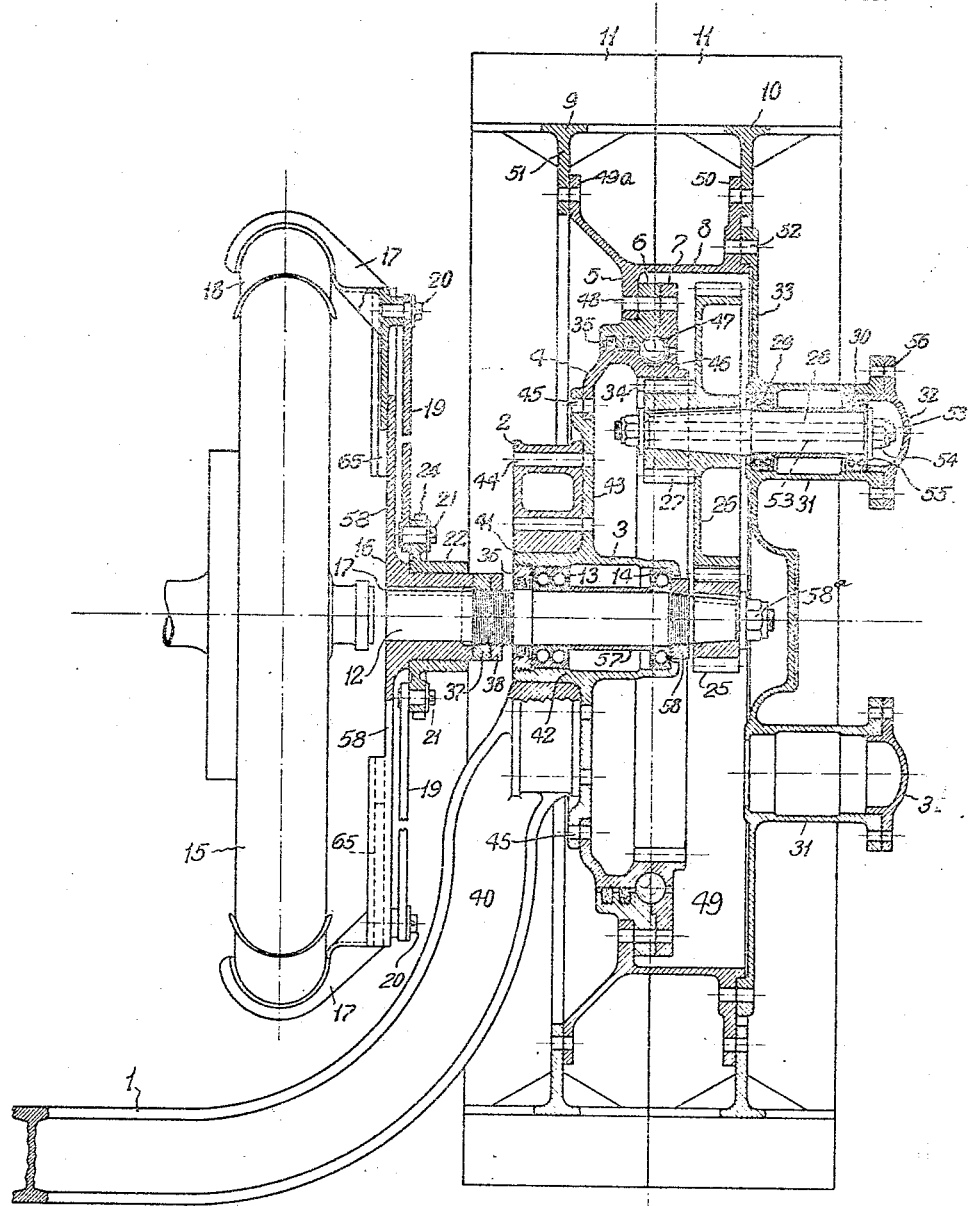
Figure 1 is a horizontal sectional view of a traction wheel relative to one of the rear driven wheels of an automobile.

In the drawings, the reference numeral 1 denotes a draw bar which serves functionally as a dead axle and to which farm implements or various kinds of vehicles may be coupled to be hauled by the tractor. The ends of the draw bar are curved, as at 40, and provided with cylindrical heads 2 having concentric openings 41, said openings having a common axis parallel to the draw bar 1, thus providing a rigid yoke shaped member that may be placed contiguous to the rear driven wheels 15 of an automobile.

Extending into the opening 41 of each draw bar head 2 is the inner end 42 of a hollow hub 3, said hub having a peripheral flange or face plate 43 that is adapted to be bolted or otherwise fixed relative to the head 2, at 44 so that the hub 3 is non-rotatable. The face plate 43 has its peripheral edges extending beyond the head 42 and shaped to provide a seat for a combined inner ball race member and internal rack, which has an annular flange 4 bolted or otherwise fixed to the face plate 3, as at 45. The internal rack is designated 34 and surrounds the outer end of the hollow hub 3, with a ball race 46 in a periphery or outer wall of said rack.

Surrounding the combined inner ball race member is a two-part outer ball race member, composed of parts 6 and 7 which maintain balls 47 on the ball race, said ball races and the balls constituting an annular anti-frictional bearing about the internal rack. The part 6 of the anti-frictional bearing may be provided with dust rings or guards 35 to exclude dust and foreign matter from the bearing.

When connecting the bearing parts 6 and 7 together the annular web 5 of a traction wheel hub 8 is also connected to said parts, as at 48, said traction wheel hub providing a housing 49 that surrounds the anti-frictional bearing and affords clearance for planetary gearing to be hereinafter referred to.

The traction wheel hub 8 has peripheral flanges 49ª and 50 to which may be connected the annular webs 51 of a traction wheel, preferably composed of sections 9 and 10, each being practically the equivalent of a wheel and when assembled relative to the hub 8 providing a wheel of sufficient width for traction purposes. The rims of the wheel sections 9 may be provided with spuds, ribs or other devices 11 that will increase the tractive power of the wheel, particularly when smooth and indurate surfaces are encountered.

Detachably connected as at 52, to the web 50 of the traction wheel hub 8 is a hub plate 33 adapted to close the hub or housing 49 and exclude dust and foreign matter from the internal rack 34 and a planetary gearing associated therewith.

The hub plate 33 has one or more housings 31 with the axis of each housing disposed at right angles to the hub plate 33 and all of said housings disposed circumferentially about the axes of the hollow hub 3, but some of the housings 31 may be in closer proximity to the axis of the hollow hub 3 than other housings.

Mounted in one of the housings 31 are anti-frictional bearings 29 and 30 for a stud shaft 28 which has the inner end thereof tapered to receive a compound or stepped gear wheel, composed of a large gear wheel 26 and a pinion 27. This compound gear wheel is retained upon the stud shaft by a tie rod 53 and nuts 54, said tie rod and said nuts having washers 55 that hold the stud shaft 28 assembled relative to the bearings 29 and 30 within the housing 31. The outer end of the housing 31 has a detachable cap 56 that permits of easy access being had to the housing to remove the stud shaft. This may be accomplished after the hub plate 33 is detached and the compound gear wheel removed from the inner end of the stud shaft 28.

The pinion 27 meshes with the internal rack 34 and the large gear wheel 26 meshes with a small gear wheel 25 fixed on the end of a short live axle 12, journaled in antifrictional bearings 13 and 14 mounted in the hollow hub 3 and spaced apart therein by a sleeve 57.

The anti-frictional bearings 13 and 14 are also held in position by a nut 58ª secured on the outer end of the live axle 12 and a nut 36 secured in the inner end of the hollow hub 3, said nut having a dust ring or guard to exclude dirt or foreign matter from the hollow hub.

The inner end of the live axle 12 supports the hub of a spider 16 and the spider hub is keyed or otherwise fixed for rotation with the live axle, but is capable of longitudinal adjustment thereon, which is accomplished by nuts 37 and 38 secured on the live axle at the outer end of the spider hub. The spider hub has radially disposed arms 58 with the outer ends thereof channel shaped as at 65 to afford guides for removable jaws 17, which have the outer ends thereof provided with shoes or clamping members 18 that are semi-circular in cross section and segment shaped in elevation, so that all of the shoes will conform to the tire or periphery of the automobile wheel 15 and may be clamped or fixed thereto.

To accomplish this the jaws 17 are provided with studs 20 extending through slots 59 in the channel ends of the spider arms 58 and pivotally connected to the studs 20 are links 19 which are pivotally connected to studs 21, carried by a ratchet wheel 24 having a nut and hub portion 22 rotatable on the spider hub.

Engaging the ratchet wheel 24 is a pivoted spring pawl 23 pivotally connected to the spider, and by placing a wrench or other tool on the nut 22 of the ratchet wheel 24 said ratchet wheel may be rotated, for instance in the direction of the arrow of Fig. 2, to retract the jaws 17 and positively clamp the shoes 18 on the tire or periphery of the automobile wheel, thereby establishing a driving relation between the automobile wheel and the short live axle 12, which is in the axis of said automobile wheel, but no part of the axle or wheel hub of the automobile. The pawl 23 will hold the ratchet wheel in its adjusted position so that the shoes 18 cannot become accidentally disengaged, and the mechanism just described constitutes means for attaching a tractor wheel to an automobile, without the removing of any part of the automobile.

In first adapting the attachment for an automobile, it is preferable to loosen the nuts 37 and 38 and shift the coupling mechanism toward the inner sides of the traction wheels. The shoes or jaws of each coupling mechanism are distended and one of the jaws of each coupling mechanism removed. This is easily accomplished by removing the links 19 from the studs 20 and removing the jaws from the guides of the spider 16. The automobile having the wheels 15 can then be backed into position, the removed jaws replaced, the ratchet mechanisms actuated to set the jaws and shoes relative to the peripheries of the wheels 15 and then the nuts 37 and 38 tightened. This will correctly position the coupling means on the live axles 12 so that no further adjustment in this particular is required when again placing the attachment in engagement with the wheels 15. The longitudinal adjustment of the spiders on the live axles is only necessary when adapting the attachment to different types of automobiles. Of course the rear axle of the automobile is jacked up or otherwise elevated prior to pushing the tractor attachment into position, and when once attached the weight of the rear end of the automobile is wholly sustained by the annular anti-frictional bearings in the hubs of the traction wheels. There is a driving relation established between the automobile wheels and the traction wheels without any of the tractor load being thrown on the coupling means between the automobile wheels and the traction wheels, and there is sufficient weight at the traction wheels to maintain the same on the ground irrespective of the draft between the automobile and the load pulled thereby.

The draw bar or rigid yoke shaped member 1 may be made in two parts adjustably connected together, as at 60, so that the longitudinal dimension of the draw bar may be increased prior to pushing the tractor attachment into place, thus providing clearance for the wheel coupling devices at the outer sides of the automobile wheels. Then by adjusting the draw bar the wheel coupling devices are drawn into position about the automobile wheels and the jaws 17 may be retracted to couple the traction wheels relative to the automobile wheels.

To prevent the draw bar from swinging about the rear axle of the automobile and the short live axles 12, said draw bar may have suitable brackets 61 or other devices by which it will be held either from the rear axle housing of the automobile, the frame or body thereof.

To change the speed in connection with the planetary gearing of each traction wheel, it is only necessary to remove the hub plate 33 of the wheel and substitute other compound gears for the gear wheel 26 and the pinion 25. It may be preferable to have different sets of compound gears with a set for each of the housings 31 in which instance the stud shaft 28 is transferred to the housing with which the compound gear is to be used. Since the planetary gearing exclusive of the internal rack 34 can be bodily removed from the traction wheel hub, all these changes can be quickly made, and it is also possible to remove the wheel coupling means relative to the traction wheel hub. As the hub plate 33 closes the hub or housing 49 the housing or hub may be filled with grease or a suitable lubricant to insure a thorough lubrication of the planetary gearing, and as a matter of fact any suitable speed reducing mechanism may be embodied in the traction wheel hub so as to operate the traction wheel at a reduced speed relative to the automobile wheel.

What I claim is:—

1. Means adapted for converting a light duty four wheel vehicle into a heavy duty vehicle, comprising traction wheels placed at the outer sides of the rear drive wheels of a light duty vehicle and coupled to the peripheries of said wheels to maintain said wheels off the ground and establish a driving relation between said vehicle wheels and said traction wheels, and means held stationary by the rear axle of the light duty vehicle and extending between said traction wheels and the rear drive wheels of the light duty vehicle for connecting said traction wheels.

2. A tractor attachment comprising stationary connected traction wheel hubs, traction wheels on said hubs outside of the connecting means of said traction wheel hub, anti-frictional bearings between said hubs and said traction wheels, and means within said traction wheel extending through said stationary hubs and adapted to be clamped to automobile wheels for transmitting power therefrom to said traction wheels.

3. A tractor attachment comprising a draw bar having traction wheel hubs at the ends thereof, traction wheels rotatable about said hubs, anti-frictional bearings between said hubs and said wheels, packing rings at the inner sides of said bearings, and means extending through said hubs adapted to be coupled to the peripheries of automobile wheels to maintain said wheels off the ground and transmit power from said wheels to said traction wheels.

4. A tractor attachment comprising a draw bar, traction wheel hubs fixed at the ends thereof and providing internal racks, traction wheels rotatable about said hubs, hub plates connected to said traction wheels, live axles in said hubs, compound gears carried by said hub plates adapted for transmitting power from said live axles to the internal racks of said traction wheel hubs, and means on the inner ends of said live axles adapted for coupling said axles to automobile wheels and maintain said wheels off the ground.

5. A tractor attachment comprising traction wheels, live axles extending into said wheels, planetary gearing in said wheels adapted for transmitting power from said live axles to said wheels, means at the inner ends of said live axles adapted for connecting said axles to automobile wheels independent of the axle or hubs of said automobile wheels, and means connecting said traction wheels and extending between said traction wheels and the automobile wheel to maintain said traction wheels in parallelism with the automobile wheels.

6. A tractor attachment for automobiles comprising traction wheels, live axles in said wheels, means in said wheels adapted to reduce the speed thereof relative to said live axles, adjustable means on the inner ends of said live axles adapted for establishing a driving relation between said live axles and the wheels of an automobile, and means adapted to be connected to an automobile and connect said traction wheels by extending between said traction wheels and the automobile wheels to maintain said traction wheels in parallelism with said automobile wheels.

7. The combination of a draw bar, a head on each end thereof, a hollow hub extending into each head, a face plate on said hub, an internal rack carried by said face plate, a traction wheel hub rotatable about said rack, a hub plate connected to said traction wheel hub, a live axle journaled in said hollow hub, and means carried by said hub plate establishing a driving relation between said rack and said live axle.

8. The combination of a draw bar, a head on each end thereof, a hollow hub extending into each head, a face plate on each hub, an internal rack carried by each face plate, a traction wheel hub rotatable about each rack, flanges carried by said traction wheel hub, a traction wheel connected to each flange, a hub plate connected to said traction wheel hub, a live axle journaled in said hollow hub, and means carried by said hub plate establishing a driving relation between said rack and said live axle.

9. The combination of a draw bar, a head on each end thereof, a hollow hub extending into each head, a face plate on said hub, an internal rack carried by said face plate, a traction wheel hub rotatable about said rack, a traction wheel connected to said hub, a hub plate connected to said traction wheel hub, a live axle journaled in said hollow hub, means carried by said hub plate establishing a driving relation between said rack and said live axle, and means on said live axle wholly outside of said wheel adapted for attaching said traction wheel to an automobile wheel.

In testimony whereof I affix my signature in the presence of two witnesses.

NELS L. OLSON.

Witnesses:
ANNA M. DORR,
KARL H. BUTLER.

Copies of this patent may be obtained for five cents each, by addressing the "Commissioner of Patents, Washington, D. C."